Aug. 10, 1926.
J. J. BORAH
1,595,541
BED ATTACHMENT FOR AUTOMOBILES AND TRAILERS
Filed May 1, 1924  2 Sheets-Sheet 1
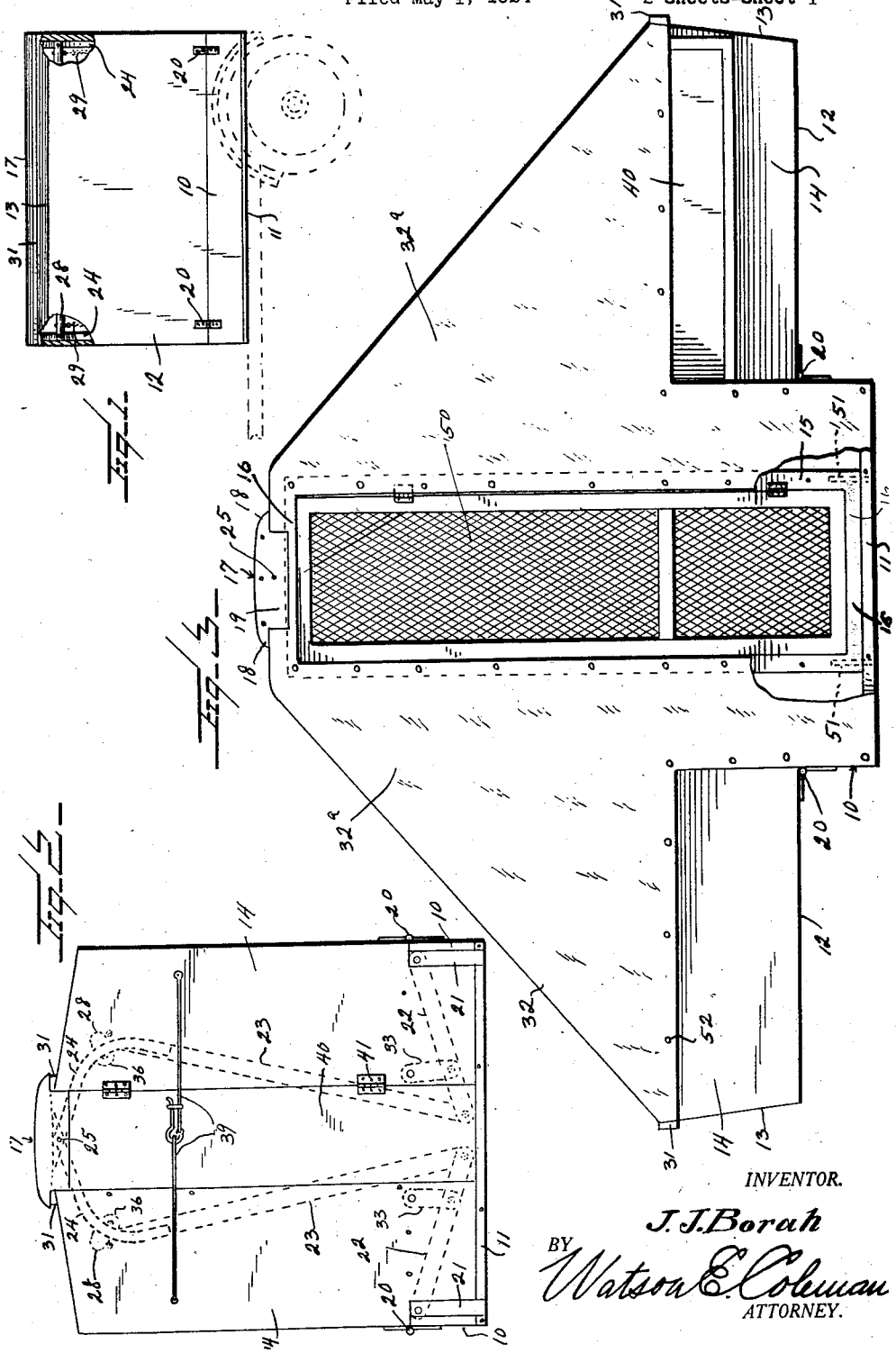
INVENTOR.
J. J. Borah
BY
Watson E. Coleman
ATTORNEY.

Aug. 10, 1926.
J. J. BORAH
1,595,541
BED ATTACHMENT FOR AUTOMOBILES AND TRAILERS
Filed May 1, 1924  2 Sheets-Sheet 2
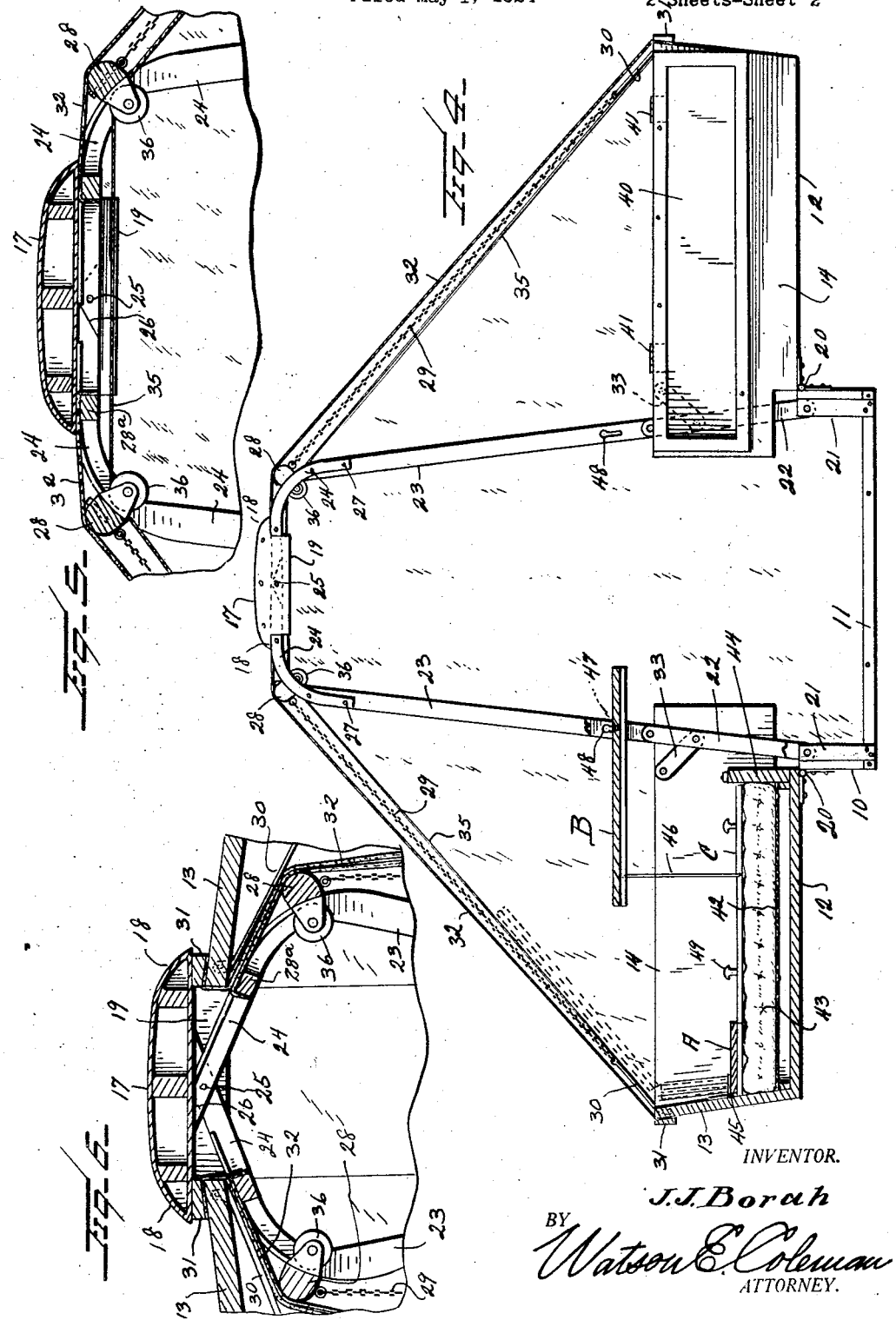
INVENTOR.
J. J. Borah
BY Watson E. Coleman
ATTORNEY.

Patented Aug. 10, 1926.

1,595,541

UNITED STATES PATENT OFFICE.

JAMES J. BORAH, OF HURON, SOUTH DAKOTA.

BED ATTACHMENT FOR AUTOMOBILES AND TRAILERS.

Application filed May 1, 1924. Serial No. 710,418.

This invention relates to bed attachments for automobiles, and particularly to an attachment of this character which is mounted upon the body of the automobile, which may be folded compactly when not in use, and may be unfolded for use.

The general object of the invention is to provide an attachment of this character which is adapted to be mounted on or form part of the body of an automobile or other like vehicle and in which two beds are provided, one on each side of vehicle, hingedly mounted so that they may be turned up into a vertical and folded position for traveling and turned down into a horizontal position when it is desired to use the beds.

A further object is to provide a structure of this character which is simple and yet strong, in which the beds may be readily shifted into or out of their opened position, and in which a canvas covering or tent is provided mounted upon the framework of the bed structure, which will fold up with the bed structure and open out to provide two downwardly inclined covers or roofs over the beds when the beds are unfolded.

A still further object is to provide a door frame at the rear of the bed supporting frame and mount upon one of the beds a door which, when the beds are folded up in their compact form, will close the end of the bed supporting frame.

Another object is to provide a screen door normally carried by one of the beds and adapted to be hung up upon the bed frame, and to provide a table structure which is so mounted upon one of the beds that it may be shifted down upon the bed clothes, turned up into position against the convas cover or tent wall, or shifted into a position where it may be used as a table.

Still another object is to provide a structure of this character in which the top is particularly rigid due to the fact that the supporting members for the top are hinged to the main body instead of to the bed frame, and in this connection to provide a structure wherein the beds are hung to the top frame, which insures rigidity when opened, thereby preventing any undue strain on the tent and eliminating the use of props or legs under the beds when unfolded.

A further object is to provide a top which will be dust and water-proof and completely close the opening between the beds.

Other objects will appear in the course of the following description.

My invention is illustrated in the accompanying drawings, wherein:—

Figure 1 is a side elevation partly in section of a bed structure made in accordance with my invention and applied to the chassis of an automobile, the fragmentary view of the automobile being in dotted lines;

Figure 2 is a rear end elevation of the structure;

Figure 3 is a rear end elevation of the structure as in Figure 2 but with the beds swung outward in a horizontal or operative position;

Figure 4 is an end elevation of the bed structure, certain of the parts being in section;

Figure 5 is an enlarged transverse sectional view on a vertical plane showing the upper portion of the structure when the bed structure is expanded;

Figure 6 is a like view to Figure 5 but showing the position of the parts when the bed structure is contracted;

Referring to these drawings, 10 designates the body of an automobile having a bottom 11 and upstanding side walls, as is usual, this body being constructed in any suitable manner and being supported upon the usual chassis.

Hinged to the side walls of the body are the oppositely disposed couch or bed frames, each consisting of a wall 12, which forms the bottom of the couch or bed frame when the latter is turned into a horizontal position, the end wall 13 which, when the bed is turned into a horizontal position, extends upward and slightly outward, and the end walls 14. This bed or couch frame may be constructed in any suitable manner and I do not wish to be limited to the details of construction illustrated.

Adapted to be used at one or both ends of the body when the body is opened so that the beds are unfolded are rectangular frames comprising the upright members 15 and the cross or connecting member 16 at the top and bottom of the frame. The bottom of this frame formed of the members 15 and 16 is held to the floor 11 of the body by means of screws or in any other suitable manner, as will appear hereafter, and the upper portion of the frame is held in place at the top by buttons after the top is unfolded. A screen door 50 may be mounted in this frame, as will be later stated.

Extending longitudinally along the top and supported by members 23, as will hereafter appear, is a longitudinally extending member 17 which may be called a ridge piece. This piece has what may be termed projecting eaves 18 and at its ends the member 17 extends downward to form walls 19 which may be attached to the cross pieces 16 of the end frames. The two boxes or frames formed of the parts 12, 13 and 14 are hinged at 20 to the side wall of the automobile so that these bed frames may be turned up into a vertical position or turned into a horizontal position. When turned into a horizontal position, the end pieces 14 of the bed body extend downward approximately to the bottom of the body 10.

Mounted upon the body 10 and extending upward from the floor 11 thereof are the supports 21. There are two of these supports at each end of the body, and pivotally connected to these supports are the links 22 which are adapted to fold inward when the beds are collapsed, as illustrated in Figure 2, and folded upward into an approximately vertical position when the beds are extended. To each of these links 22 there is pivoted a relatively long support 23 and each of these supports at its upper end has bolted to it a curved angle iron 24. These curved irons extend inward and upward toward each other, and when the bed is unfolded the upper ends of these curved angle irons are disposed in a line directly beneath the eaves 18. The inner ends of these curved angle irons 24 cross each other and are pivoted to each other, as at 25, the extremities of these irons being beveled, as at 26, and overlapping. When the beds are folded up, as illustrated in Figure 2, these beveled end faces 26 are disposed in line with each other and in a horizontal plane just beneath the ridge piece. These irons 24 partially embrace the braces 23 and are bolted thereto, as at 27.

Also bolted to these angle irons 24 are the longitudinally extending tent supporting beams 28. There are two of these beams which extend longitudinally of the machine, and fastened to each of these beams at opposite ends thereof and extending downward to the outer ends of the bed frames are the chains 29, these chains at their lower ends being connected by links 30 to the longitudinal beams 31 of the bed frame. Attached to the outer ends of the bed frames and passing over these beams 28 is the canvas 32, this canvas extending over the beams 28 and then extending inward and being attached to longitudinally extending bars or framing members 28ª extending parallel to the ridge member 17 but spaced slightly therefrom and attached to the supports 23. When the beds are folded up in the position shown in Figure 6, this canvas 32 is adapted to fold inward so as to be entirely housed within the bed frames, but when the bed frames are opened out, as illustrated in Figure 3, the canvas extends downward and forms a roof for these lateral extensions of the body, this roof extending upward to the ridge piece 17 and having water-tight joint with what may be termed the eaves 18, as before stated. The chains 29 take off all strain on this canvas, and it is the chains which support the bed frames and beds when the bed frames are in their horizontal positions. Pivoted to the end members 14 of the bed frames are relatively short links 33, these short links being pivoted in turn to the links 22. When the bed frames are turned into their vertical positions, it will be obvious that these links 33 will act to force the links 22 and the members 23 into an angular relation to each other, as illustrated in Figure 2, but when the members are as illustrated in Figure 4, that is, opened up, the links 33 act to hold the links 22 and the supports 23 in aligned position, the weight of the bed frame 14 resisting any tendency of these members 22 and 23 to get out of alignment.

For the purpose of exerting lifting force upon the bed frames so as to collapse the beds, as indicated in Figure 2, I attach to the bed frames at their ends a cord 35, which cord extends upward from both bed frames toward the upper ends of the members 23 and passes over rollers or pulleys 36 mounted on the top frame. To collapse the structure, the cord 35 is simply grasped in the center and pulled down and out as the operator steps out from between the members 23 and the cord is hooked in a suitable catch. Thus it will be obvious that upon pulling downward upon the cord 35, the free ends of the beds will be lifted and as they are lifted the canvas and the chains will fold inward, as shown in Figure 6, so as to form downwardly extending loops entirely housed within the bed frames. When the bed frames are drawn upward, the inner ends of the outer walls 13 and the longitudinally extending members 31 will extend beneath the eaves 18, as shown in Figure 6, and the ridge piece will project over these end walls and particularly over the beams 31 and any water which strikes the top will be discharged over onto these end walls 13, and as these end walls are downwardly and outwardly inclined, as in the position shown in Figure 6, the water so discharged upon the end walls 13 will run off. The bed frames may be held in their vertical position by any suitable means as, for instance, by the coacting latching members 39.

Mounted upon the end wall 14 of one of the bed frames is a door 40, which door is hinged at 41 to the wall 14, and when the bed frame is turned into its vertical position, as illustrated in Figure 2, this door will close the rear end of the structure and close the space between the end walls of the bed frame. A like door may, of course, be provided upon the other end of the structure. This door 40 is permanently hinged upon the end wall 14 by hinges 41 but a screen door 50 may also be provided adapted to be hinged upon one of the supports 15 so as to close the space between the supports 15 at the rear end and be used when the beds are opened out. Preparatory to traveling, however, the screen door may be placed upon one of the beds and then when the beds are folded, the screen door will be held in a vertical position and will assist in holding the bed clothes in place and prevent the mattress or bed clothes from shifting as the machine travels.

Disposed within the bed frames formed of the members 12, 13 and 14 is the spring mattress 42, and resting upon this mattress is the regular mattress and the bedding, designated generally 43. It will be seen that this mattress 42 and the mattress and bedding 43 do not come down to the inner end of the members 14 but stop at the inner end of the wall 12, the spring mattress being mounted at one end upon the wall 13 and at its opposite end upon a side rail or wall 44.

In order to hold the mattress and bedding in place and prevent them from shifting around, I preferably provide a table, as shown in Figure 4, which table is formed in two sections A and B with an exterior frame C. The section A is hinged to the side wall 13 of the bed by hinges 45 so that this section A may be turned up against the wall 13 or turned down into a horizontal position. Pivoted to the side walls of the frame C are the links 46, which links are pivoted at their upper ends to the table section B. Thus the table section may be turned into a position where it is aligned with the section A and so covers over the mattress and the bedding or turned into an elevated position, as shown in dotted lines in Figure 4 where the section A is turned upward against the side wall of the bed and the section B extends upward along the lower portion of the tent or it may be turned up into the position shown in full lines in Figure 4 where a lug 47 engages in a keyhole slot 48 formed in one of the supports 23. By lifting up the table it may be withdrawn from the keyhole slot and then this table section may be swung over into alignment with the section A and lie flat down upon the frame C where it may be held by buttons, bolts or any other suitable means. Of course, the table will be turned up to the position shown in dotted lines in Figure 4 whenever the beds are to be used as beds. When traveling, the table will be down flat against the mattress and bed clothing, thus holding the bed clothes in place. When it is desired to use the table for dining or other purposes, the table is placed in the position shown in Figure 4 and locked in this position.

The structure which I have heretofore described provides an automobile bed attachment which is very convenient, compact and effective. Inasmuch as the bed frames formed of the parts 12, 13 and 14 are hung to the top frame by means of the chains 29, the parts are particularly rigid and no undue strain is placed on the tent. This eliminates the use of props or legs under the beds when unfolded. Furthermore, the ridge piece 17 in connection with the canvas 32 provides a dust and water-proof closure for the bed structure when it is opened out, and when the bed structure is closed up, as shown in Figure 2, the end walls 13 come beneath the eaves 18 and form a waterproof joint completely enclosing the beds. It will be seen that there is provided a very roomy structure and very rigid by reason of the fact that the supports 22 and 23 are hinged to the members 21 which form part of the body and not part of the bed frame. In folding, the canvas covering will drop inside and leave the metal top outside to close the opening between the two frames, thereby making a dust and water-proof structure. Each pair of the supports 23 and their curved angle irons 24 are pivoted together by only one pivot 25 at the top. This is made possible by the angle iron bends at the top of the frame. The ends of the angle irons 24 are so shaped that the top is held true to position at both extreme movements of the bed frames either when the bed frames are raised or when they are lowered. By reason of the fact that there is only one pivot for each pair of frame bars 23 and their extensions 24, rigidity is insured, and this structure will admit of one bed being occupied while the other is empty.

As will be seen by a comparison of Figures 2 and 3, when the braces or supports 23 and 22 are in alignment, the ridge piece 17 will be lifted so as to stretch the canvas. Under these circumstances, a screen door 50 which is mounted upon the frame 15 will close the door opening into the interior of the structure. When the beds are shifted to their vertical positions, as shown in Figure 2, however, the ridge piece 17 is lowered and the door 50 and the frame 15 will no longer fit in place, and under these circumstances it is necessary that the frame 15 and the door 50 shall be removed before the beds 14 are collapsed. In traveling, therefore, this frame 15 with the door 50 is disposed upon one of the beds and may be fastened in place by the screws or dowel pins 51, as shown in Figure 3, as engaging the frame 15 with the bottom 11 of the body.

It will be noted from Figures 5 and 6 that when the members 23 are in their approximately vertical positions, the ridge piece 17 will fit down close upon the canvas 32 and that when the supports 23 are shifted inward, as illustrated in Figure 6, the ridge piece will fit down closely upon the longitudinally extending beams 31 and that under all these circumstances a thoroughly water-proof joint is formed between the ridge piece and the top of the structure which will prevent the inlet of any water.

The canvas end walls 32ª, which are preferably made in one piece with the canvas 32 or sewed thereto, are fastened to the frame 15 and to the end walls 14 of the beds by means of buttons 52, as shown in Figure 3, and when the beds are shifted to their raised position, that is the position shown in Figure 2, these end walls 32ª are folded inward.

The body, as described, can be placed upon a car, light truck or trailer, as the weight of the entire construction is only about 550 pounds. It is to be built entirely of light, strong wood, while braced by iron and covered with a heavy canvas which is glued thereto. The canvas or khaki cloth which forms the roof is, of course, to be water-proofed and is bolted through grommets along the eaves and has snap fasteners at the ends and around the screen door so that it may be fly and insect proof.

In folding up the construction after use, the end curtains are unsnapped and the ends are snapped together inside. The screen door is removed and slipped into position on top of the bed and held in this position. The rope or cable 35 is now grasped and pulled down and outward as the person manipulating the rope steps out through the door. The rope is then snapped into the spring catch 37, as previously stated. To finish the folding, the operator steps to one side and with a slight push closes the beds up. The bed frames are then latched in their closed position, as shown in Figure 2, and the structure is ready for the road. The reverse operation is performed, of course, when the structure is unfolded.

I claim:—

1. The combination with the body of a vehicle having a floor and upwardly extending side walls, of bed frames hinged to the side walls for movement into a vertical or horizontal position, each bed frame comprising end walls, a bottom and an outside wall, a rectangular supporting frame mounted upon the bottom of the vehicle body and extending upward at an end thereof, links operatively pivoted to the bottom of the vehicle body adjacent the inner ends of the bed frames, supports pivoted to the extremities of said links and extending upward to the upper ends of the supporting frame and there provided with inwardly curved portions, the inwardly curved portions overlapping and being pivoted to each other, a ridge member carried upon the supports over the overlapping ends of said members, the ridge member having outwardly projecting eaves beneath which the ends of the bed frames are adapted to engage when the bed frames are raised to a vertical position, and links pivoted to the first named links and extending outward therefrom and pivoted to the bed frames and acting to hold the first named links and the supports pivoted thereto in an approximately vertical position when the bed frames are lowered to a horizontal position.

2. The combination with a vehicle body having upstanding side walls and a bottom, of bed frames hinged to the side walls and adapted to be turned into a vertical position or into a horizontal position, each of said bed frames comprising a bottom, end walls and a rigid outer wall, supports mounted upon the vehicle body and extending upward therefrom at opposite ends, a pair of outer longitudinally extending beams and a pair of inner longitudinally extending beams carried upon the upper ends of the supports, a ridge piece mounted upon the supports and extending longitudinally of the vehicle body and having outwardly projecting eaves, a canvas attached to the inner longitudinally extending beams and extending over the outer of said pairs of longitudinally extending beams and then extending downward and outward and being attached to the outer wall of the bed frames, chains attached to the outer ends of the bed frames and extending upward to said outer beams, pulleys mounted upon the outer beams, and cords passing over said pulleys and operatively connected to the bed frames and extending down parallel to the chains when the bed frames are lowered whereby to raise the bed frames in a vertical position.

3. The combination with a vehicle body having upstanding side walls and a bottom, of bed frames hinged to the side walls and adapted to be turned into a vertical position or a horizontal position, said bed frames including a longitudinally extending outer wall, a plurality of pairs of upwardly extending supports, the complementary members of each pair of supports being mounted upon the body adjacent the opposite side walls thereof and extending upward above the bed frames and then inward toward each other and being connected to each other, a longitudinally extending ridge piece mounted upon the inwardly turned ends of the supports and having outwardly projecting eaves, two canvas side walls each having one margin below the eaves of the ridge piece and extending downward and outward and being attached to the outer wall of the corresponding bed frame, flexible connections operatively engaged with the upper ends of the supports and operatively engaged at their lower ends with the free ends of the bed frames and acting to support the same when the latter are turned into a horizontal position, the bed frames being adapted to be turned into a vertical position with the inner margins of the outside walls of said bed frames extending beneath said ridge piece and being protected thereby.

4. The combination with a vehicle body having upstanding side walls and a bottom, of two bed frames hinged to the side walls and adapted to be turned into a vertical position or a horizontal position, each of said bed frames comprising a bottom, end walls and an outer wall, a plurality of pairs of supports pivotally mounted upon the vehicle body at their lower ends and the members of each pair extending upward and then inward toward each other and being pivotally connected to each other at their adjacent ends, longitudinally extending beams carried upon the upper ends of the supports, a ridge piece operatively mounted upon the supports and extending longitudinally of the vehicle and having outwardly projecting eaves, canvas walls attached adjacent this ridge piece on each side thereof below the eaves and extending over said beams and extending downward and outward and being attached to the outer walls of the bed frames, and flexible connections attached to the beams and attached to the outer ends of the bed frames whereby the bed frames may be supported in a horizontal position and the bed frames being adapted to be turned into a vertical position with the inner margins of the outside walls of the frames extending beneath said ridge piece and being protected thereby.

5. The combination with the body of a vehicle having a floor and upwardly extending side walls, of a plurality of pairs of supports operatively hinged to the body at their lower ends, each pair of supports having its upper ends extended inward and the members overlapping, a ridge piece disposed longitudinally of the vehicle and above the overlapping ends of the supports, the supports being pivoted to each other and operatively pivoted to the ridge piece, longitudinally extending parallel framing members connecting the upper ends of the supports on each side of the middle of the vehicle and inward of the lateral margins of the ridge piece, bed frames each consisting of a bottom, end members and an outer longitudinally extending wall, hinged to the side walls of the vehicle, canvas attached to said framing members and extending downward therefrom to the outer walls of the bed frames, and flexible supporting connections connected to the outer walls of the bed frames and operatively connected to said supports, the bed frames being adapted to be turned into a vertical position with the inner margins of the outside walls of the bed frames extending beneath said ridge piece and protected thereby.

6. The combination with the body of a vehicle having a floor and upwardly extending side walls, bed frames hinged to said side walls for movement into or out of a horizontal position, of a plurality of pairs of supports operatively hinged to the body at their lower ends, each pair of supports having its upper ends extended inward and the members overlapping, a ridge piece disposed longitudinally of the vehicle and above the overlapping ends of the supports, the supporting members being pivoted to each other and operatively pivoted to the ridge piece, longitudinally extending framing members connecting the upper ends of the supports inward of the lateral margins of the ridge piece, canvas attached to said framing members and extending downward therefrom to the outer walls of the bed frames, longitudinally extending beams mounted upon the outside edges of the supports and extending longitudinally of the vehicle on each side of the ridge piece and over which said canvas walls pass, and flexible supporting connections attached at their upper ends to said longitudinally extending beams and extending downward to the outer walls of the bed frames and supporting the bed frames in a horizontal position.

7. The combination with the body of a vehicle having a floor and upwardly extending side walls, and bed frames hinged to said upwardly extending side walls for movement into a horizontal plane or into a vertical plane, of a plurality of pairs of supports operatively hinged to the body at their lower ends, each pair of supports having its upper ends extended inward and the members overlapping, a ridge piece disposed longitudinally of the vehicle and above the overlapping ends of the supporting members, the supports being pivoted to each other and operatively pivoted to the ridge piece, longitudinally extending framing members connecting the upper ends of each pair of supports inward of the corresponding lateral margin of the ridge piece, canvas attached to said framing members and extending downward therefrom to the outer walls of the bed frames, longitudinally extending beams mounted upon the outside edges of the supporting members and extending longitudinally of the vehicle on each side of the ridge piece and over which said canvas walls pass, flexible supporting connections attached at their upper ends to said longitudinally extending beams and extending downward to the outer walls of the bed frames and supporting the bed frames in a horizontal position, and means disposed entirely within the vehicle whereby the bed frames may be raised or lowered.

In testimony whereof I hereunto affix my signature.

JAMES J. BORAH.